United States Patent [19]
Schneider et al.

[11] Patent Number: 5,211,593
[45] Date of Patent: May 18, 1993

[54] FOAM-CORE STRUCTURE WITH GRAPHICS-IMPRINTED SKIN

[75] Inventors: Stephen E. Schneider, Claremont; Steven M. Moran, Long Beach, both of Calif.

[73] Assignee: Kransco, San Franciso, Calif.

[21] Appl. No.: 824,784

[22] Filed: Jan. 23, 1992

[51] Int. Cl.⁵ ............................................. B63B 1/00
[52] U.S. Cl. .................................... 441/65; 264/132; 114/357
[58] Field of Search ............................ 441/65, 68, 74; 114/357; 280/601, 602, 609, 610, 845; 428/314.4, 315.9, 316.6, 317.3, 192; 156/239, 240, 241, 222, 244.16, 277, 384, 390, 387, 385, 386; 264/129, 132

[56] References Cited

U.S. PATENT DOCUMENTS

| | | |
|---|---|---|
| 3,070,817 | 1/1963 | Kohrn et al. |
| 3,269,882 | 8/1966 | Willy |
| 3,325,332 | 6/1967 | Cleereman |
| 3,502,540 | 3/1970 | Pietrocola |
| 3,755,063 | 8/1973 | Massey et al. |
| 3,823,047 | 7/1974 | Colombo |
| 3,829,343 | 8/1974 | Remmert |
| 3,930,917 | 1/1976 | Esakov et al. |
| 4,092,198 | 5/1978 | Scher et al. .......................... 264/132 |
| 4,457,729 | 7/1984 | Peerlkamp |
| 4,539,057 | 9/1985 | Ahlm |
| 4,621,002 | 11/1986 | Kuhlmann et al. |
| 4,713,032 | 12/1987 | Frank |
| 4,850,913 | 7/1989 | Szabad .............................. 114/357 |

*Primary Examiner*—Jesus D. Sotelo
*Attorney, Agent, or Firm*—Kolisch, Hartwell, Dickinson, McCormack & Heuser

[57] ABSTRACT

A system is disclosed for applying a graphics-imprinted skin to a substrate of expanded polyolefin foam. The system is used to create bodyboards and other foam devices with durable graphic images. The skin is made of a plurality of thin-film polyethylene layers adhesively bonded together. The outermost layer is a sheet of nonopaque (i.e., clear) polyethylene with graphic images imprinted on one side. The images are printed in reverse pattern and viewed through the polyethylene sheet from the other side. The nonopaque sheet is then adhesively bonded to an opaque backing sheet along the graphic-imprinted surface. The result is a flexible laminated skin material with visible graphics on one side. The skin material is then thermolaminated to the foam substrate with the graphics facing outwardly. A method of continuous fabrication is also disclosed.

11 Claims, 2 Drawing Sheets

U.S. Patent May 18, 1993 Sheet 1 of 2 5,211,593
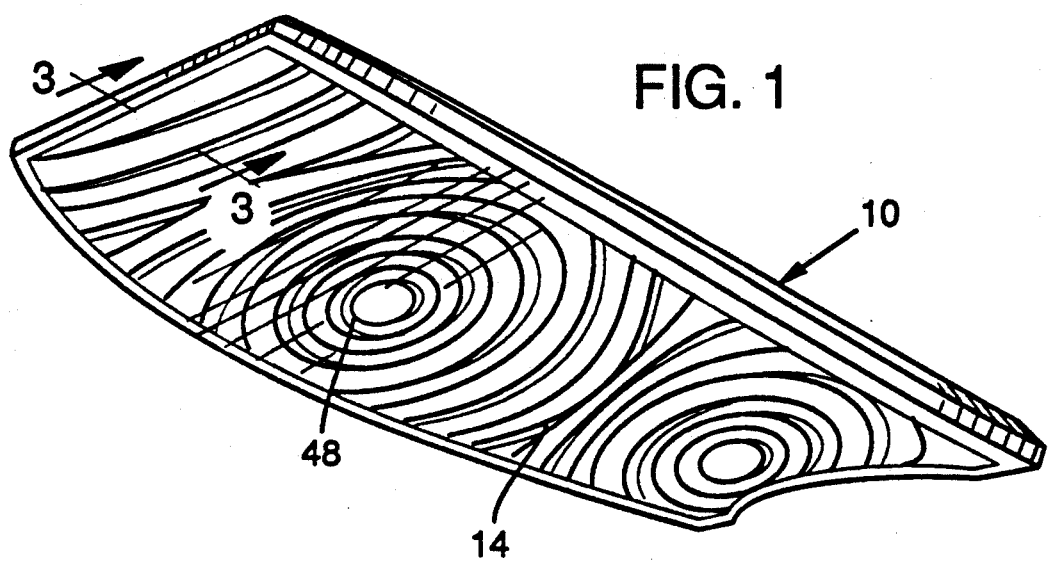
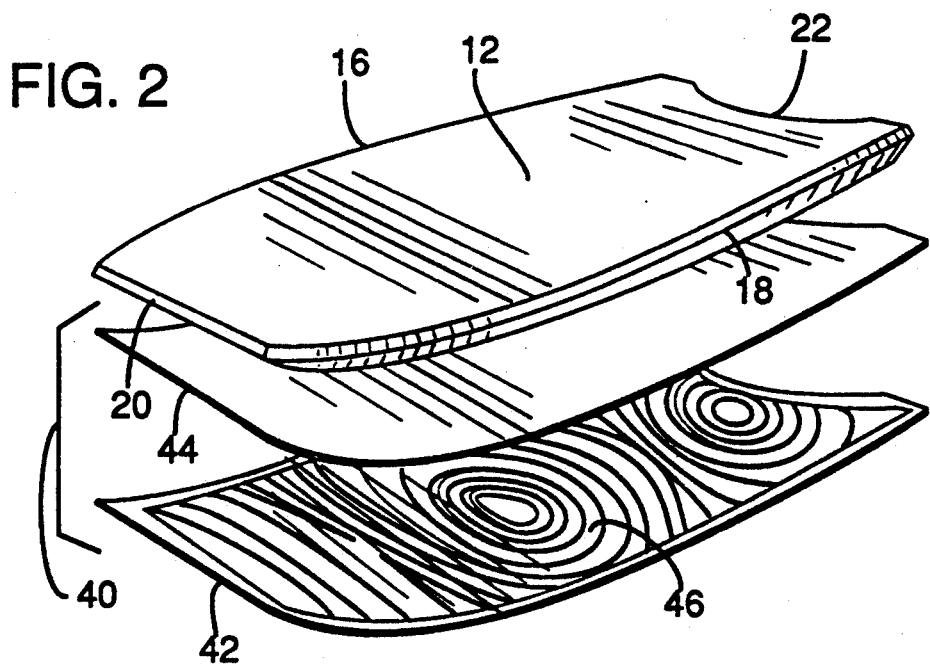

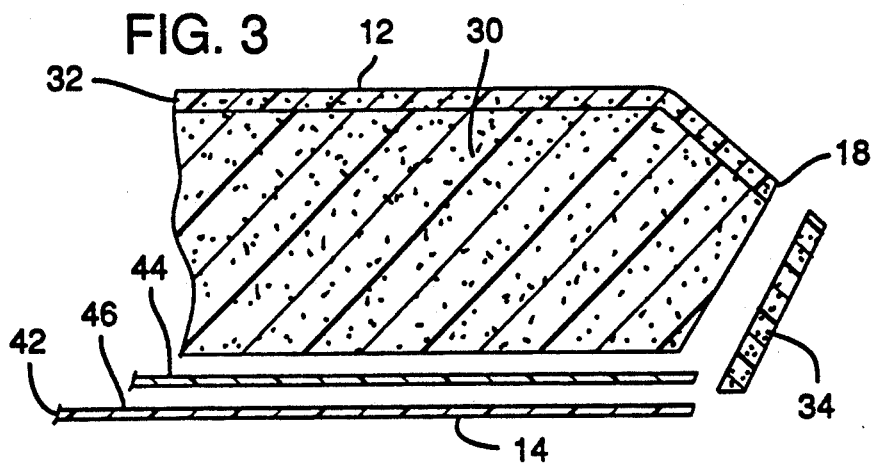
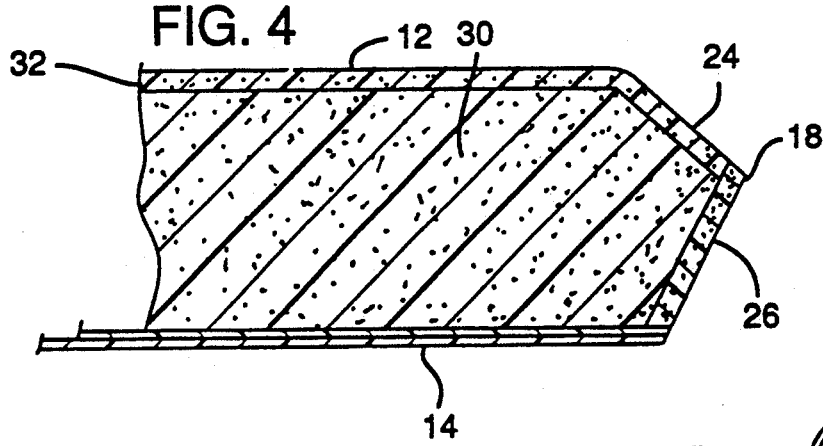
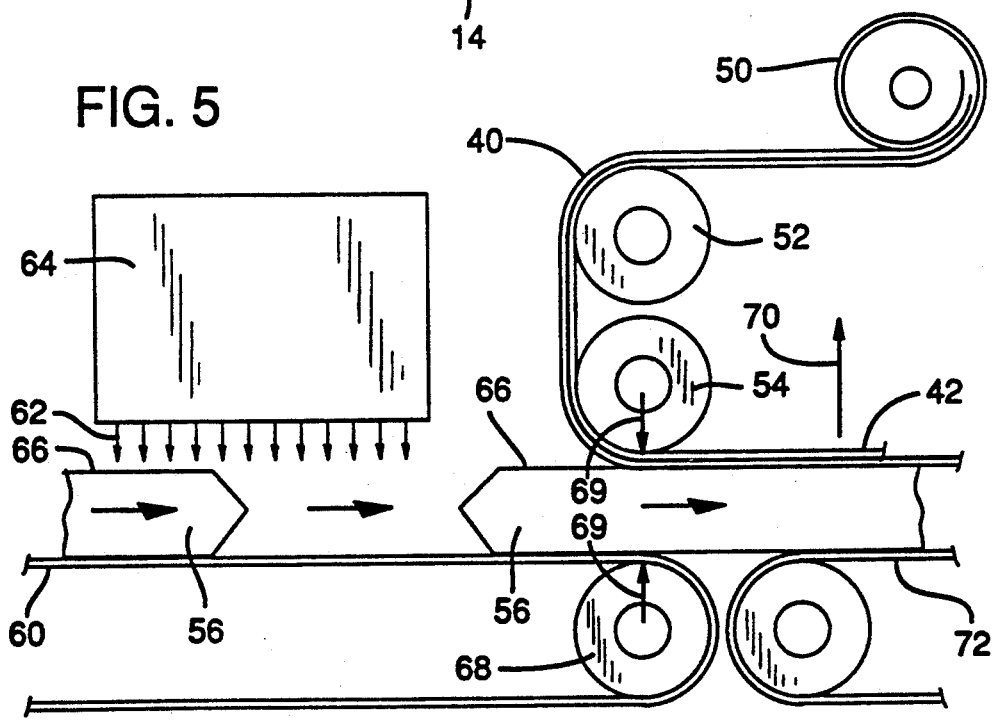

FOAM-CORE STRUCTURE WITH GRAPHICS-IMPRINTED SKIN

BACKGROUND AND SUMMARY OF THE INVENTION

The invention relates generally to laminated plastic structures used in recreational products, and more particularly to bodyboards for riding on waves in ocean surf.

Bodyboards and other amusement and recreational devices made of flotation foam are often covered with outer skin surface made of plastic or another type of non-foam sheet material to help reduce drag. On bodyboards, a non-foam skin surface is usually applied to the bottom of the board. Various techniques are employed to fabricate and adhere an outer skin to the foam core of bodyboards. One prior art technique is found in U.S. Pat. No. 4,850,913, which discloses a process for heat-laminating a film layer to a thin sheet of foam which is then bonded to the foam core of the board.

One limitation of prior art systems for adhering a film skin to the foam core of a bodyboard is the difficulty or impossibility of creating durable graphic images on the skin. For example, the '913 patent discloses how patterns of color can be applied between the outer film layer and the underlying foam during the heat-lamination process. Color concentrate is added to the surface of the film to produce elongated patterns of stripes or waves, but the result is almost certainly indistinct color variations and patterns, not sharp graphics. The '913 patent also proposes the use of a Mylar (trademark) transfer pattern for applying a logo to the outer skin, but such an image transfer process produces impermanent graphics subject to scratching and wear.

It would be advantageous to provide a system for applying sharp, distinct and wear-resistant graphics to semi-rigid foam substrates. Such a system would permit the production of bodyboards and other amusement devices decorated with bold, durable graphic patterns.

It would also be advantageous to provide a foam-core bodyboard for use in ocean surf which has a slick non-foam bottom surface imprinted with distinct, reproducible graphics.

Accordingly, the present invention provides a bodyboard for supporting a rider during travel in ocean surf. The bodyboard comprises an elongate plank made of semi-rigid foam having a thickness generally in the range of 1-inch to 4-inches. An expanse of skin is bonded to the foam at selected locations, surrounding and enclosing the foam core of the board. The skin includes a plurality of layers bonded adhesively together, including an outer layer of nonopaque polyolefin film material, such as extruded polyethylene, and an inner layer of polyolefin film. The thickness of the nonopaque outer layer is generally in the range of 1-mil to 5-mils. The outer layer of nonopaque polyolefin film includes graphical images formed on the side of the film which faces the core, whereby the images are visible through the outer layer to decorate the bodyboard.

The invention further provides a method of applying printed graphics to semi-rigid foam substrates of the type having a thickness generally exceeding 1-inch. The first step in the method is to provide a skin for application to the foam substrate. The skin is formed by the following steps: Graphics are imprinted on one side of a nonopaque (i.e., clear) thin-film plastic sheet having a thickness generally in the range of 2-mils to 5-mils. The graphics are imprinted in a reverse pattern, for viewing through the nonopaque sheet. After the imprinting step, the nonopaque sheet is adhesively bonded to a second thin-film plastic sheet with the graphics-imprinted side of the nonopaque sheet facing the second sheet. The second sheet is preferably opaque, resulting in a layered skin with the imprinted graphics visible through the nonopaque sheet. The preferred thickness of the second (opaque) thin-film plastic backing sheet is generally in the range of 2-mils to 5-mils, resulting in a graphics-imprinted, laminated skin with an overall thickness generally in the range of 4-mils to 10-mils.

After producing the skin, the skin is bonded to the foam substrate by heating a skin-receiving surface on the foam to a temperature generally in the range of 180° Fahrenheit to 220° Fahrenheit. Finally, the skin, with the nonopaque sheet oriented outwardly, is pressed against the heated skin-receiving surface to adhere the skin to the foam, whereby a skin covering with visible graphics is provided on the foam.

The above-described process is preferably carried out on a conveyor which transports the foam substrate through a heating zone which heats the skin-receiving surface to the specified temperature. The skin, previously fabricated and collected on a roll, is conveyed by one or more rollers to the skin-receiving surface of the foam, where the skin and foam are pressed together between nip rollers which apply a compressive force generally in the range of 10 pounds per-square-inch to 30 pounds per-square-inch to adhere the skin to the foam.

BRIEF DESCRIPTION OF THE DRAWINGS

FIG. 1 is a perspective view of a bodyboard viewed from the front and looking upwardly at the bottom planing surface of the board, which is the surface on which graphics are visible, in accordance with the present invention.

FIG. 2 is a perspective view, partially exploded, of the bodyboard of FIG. 1, looking downwardly from the forward end of the bodyboard, showing the separate layers of the bottom skin.

FIG. 3 is a cross-sectional view, on an enlarged scale, taken generally along the line 3—3 of FIG. 1, showing the bodyboard structure partially exploded.

FIG. 4 is a cross-sectional view as in FIG. 3 showing the parts of the bodyboard when bonded together.

FIG. 5 is a schematic view showing some of the steps in the method of applying printed graphics to a semi-rigid foam substrate in accordance with the present invention.

DETAILED DESCRIPTION OF THE PREFERRED EMBODIMENT

Referring to FIGS. 1 and 2, a bodyboard 10 is shown looking up at the underside of the board. Bodyboard 10 is an elongate, semi-rigid foam plank having a top riding surface 12 for supporting a rider and a bottom surface 14 for planing on water. Laterally opposed side edges 16, 18 extend from the front nose end 20 to the rear tail end 22 of board 10. Bodyboard 10 is typically approximately 4-feet in length and 2-inches to 3-inches in thickness at the midpoint or center of the board. The thickness of the board tapers downwardly to a smaller thickness adjacent nose end 20. Side edges 16, 18 also taper together somewhat toward the nose end. The maximum width of bodyboard 10, at its midpoint, is approximately 22-inches, tapering down to a side-to-side width of approximately 14-inches to 16-inches at nose end 20. A recess is formed in tail end 22 to create what is called a swallow tail. A typical riding position for bodyboard rider is illustrated in FIG. 1 of U.S. Pat. No. 4,894,034. The rider generally grips the nose end with one hand, with the legs trailing off the other end of the board.

Referring to FIGS. 2–4, the side edges of bodyboard 10 are beveled. On left side 18, shown in cross-section in FIG. 4, an upper beveled edge 24 is provided, called a chine, and a lower beveled edge 26 is provided, called a rail. Similar upper and lower beveled edges (not shown) are formed on right side 16. Swallow tail 22 is also sometimes beveled. These beveled surfaces help direct the flow of water around bodyboard 10 as it travels in ocean surf.

At the core of bodyboard 10 is an elongate, substantially planar foam plank 30 made of a closed cell expanded polyolefin foam, preferably of a type specially fabricated for use in bodyboards. The preferred foam for use in core 30 is called Wavecore (trademark), which is a high-quality Ethafoam ® product made by the Dow Chemical Company. Foam core 30 is covered with an outer skin. The top riding surface 12 is preferably covered with a thin layer of foam 32 which may include one or more individual foam layers laminated together. Top skin 32 is preferably a closed-cell expanded polyolefin foam, one-quarter-inch or less in thickness, which extends over both top surface 12 and downwardly along chines 24. A separate, elongate rail-piece 34, formed of a similar expanded polyolefin foam, covers side rails 26. The top and side outer skin layers 32, 34 are attached to foam core 30 by any suitable technique, such as thermomelting.

The present invention is particularly directed to the provision of a graphics-imprinted bottom skin 40 which covers the bottom planing surface 14 of bodyboard 10. Bottom skin 40 is an expanse of nonfoam skin material to extending over the lower surface of foam core 30. Skin 40 includes a plurality of layers 42, 44 bonded adhesively together. The outermost layer 42 is a thin-film plastic sheet of nonopaque (i.e., clear) polyethylene material, preferably formed by extrusion. Sheet 42 has a thickness generally in the range of 2-mils to 5-mils, with a preferred overall thickness of 3-mils. The thickness of outer sheet 42 is selected for ease of handling, durability and to facilitate the imprinting of graphics on the sheet. Sheet material less than 2-mils thick is generally too fragile for convenient handling. A thickness greater than 5-mils becomes more difficult to imprint. Inner film layer 44 is also preferably a plastic, polyethylene film sheet, formed by extrusion. Sheet 44 has a thickness generally in the range of 2-mils to 5-mils and is preferably opaque to provide a contrast with the graphics formed on outer film 42. The color of opaque inner sheet 44 is selected to contrast with the graphics in a way which highlights the appearance of the board. For that purpose, the best color for inner sheet 44 is white.

Graphics are imprinted on the inside or first surface 46 of outer sheet 42 using any conventional process for printing on polyethylene, such as the corona printing process. In corona printing, an electrical discharge temporarily alters the surface molecules of polyethylene film, allowing inks compatible with the process to adhere to the film. The present invention preferably employs inks with ultraviolet inhibitors which resist fading. Any desired pattern can be imprinted on the outer sheet 42 of skin 40, including words, logos or stylized graphics, in any color which can be used in the corona process. The graphics applied to surface 46 must be reverse-patterned because they will be viewed through sheet 42.

Following the printing of the graphics on the first side 46 of outer sheet 42, the next step in forming bottom skin 40 is to adhesively bond the graphics-imprinted sheet to a second thin-film plastic sheet 44. Sheets 42, 44 are bonded together with the graphics-imprinted side 46 of sheet 42 facing second sheet 44. The adhesive used to bond the sheets can be any conventional glue or adhesive, well-known to those skilled in the art, suitable for bonding together polyethylene sheets. The result is a layered skin 40 with the imprinted graphics 48 visible through the body of the nonopaque sheet. Skin material 40 has an overall thickness generally in the range of 4-mils to 10-mils. After the skin is fabricated, it can be collected on a roll 50 (see FIG. 5) for subsequent use in fabricating bodyboards.

FIG. 5 illustrates schematically the method of applying printed graphic skin 40 to a semi-rigid foam substrate. Roll 50 of prefabricated bottom skin material 40 is positioned to discharge the skin material over a pair of rollers 52, 54. Individual lengths of foam material 56, which may be flat planks of foam, or beveled, preformed bodyboards (as shown), are positioned on a conveyor 60, such as a belt. Conveyor 60 transports the foam substrates 56 through a heating zone 62 in which a radiant heater 64 or similar device heats the skin-receiving surface 66 of each substrate 56 to a temperature generally in the range of 180° Fahrenheit to 220° Fahrenheit. That temperature range encompasses the temperature at which polyethylene film begins to soften (180° Fahrenheit) and the melting point of polyethylene film (220° Fahrenheit). After skin-receiving surface 66 is heated, the foam substrate 56 is transported to a position where skin 40 is conveyed into contact with skin-receiving surface 66, between nip rollers 54, 68, which exert a compressive force in the direction of arrows 69. Skin 90 is positioned against the foam with the nonopaque sheet layer 42 oriented outwardly, in the direction of arrow 70. The skin 40 is preferably unheated until it comes in contact with surface 66, or the skin is only slightly warmed by the ambient heat in the vicinity of heater 64. Skin 40 and substrate 56 are mutually conveyed at the same rate through nip rollers 54, 68, which press the skin against the heated skin-receiving surface 6 to adhere the skin to the foam. A compressive force generally in the range of 10 pound-per-square-inch to 30 pounds-per-square-inch is sufficient to adhere skin 40 to foam substrate 56. After the skin and substrate have passed through nip roller 54, 68, the completed skin-covered foam is conveyed to a completion location (not shown) via conveyor 72, where the skin is cut and trimmed and fabrication of the bodyboards is completed.

The graphics provided on a semi-rigid foam substrate by the above method are far superior in sharpness and durability to those created by prior art techniques. The bottom skin is generally smooth and slick, producing an ideal surface for planing on water, and the graphics imprinted on the skin are protected against wear by the outer sheet of polyethylene. If ultraviolet inhibitors are included in the ink used to imprint graphics, the images are also fade-resistant.

Alternative embodiments are possible within the scope of the present invention. For example, the sheet material which forms the layers of the outer skin may be fabricated from an alternative polyolefin sheet material such as polypropylene. The skin material may be fabricated using one or more additional backing layers, between opaque second layer 44 and the foam substrate to which the skin is applied. Graphic-imprinted skin in accordance with the present invention can be applied to the top riding surface, as well as the bottom planing surface of the board, or to any other suitable surface. The invention can also be employed to bond graphic-imprinted skin to other foam devices. The method of the present invention is particularly adapted for applying a relatively thin outer skin to a thick foam substrate exceeding approximately 1-inch in thickness. Although the method of applying the graphic-imprinted skin is illustrated as a continuous process performed on a conveyor, it can also be performed statically by heating the skin-receiving surface to the specified temperature using a portable heater, positioning an expanse of preformed skin material against the heated surface, and applying the specified pressure between the skin and foam substrate.

The invention provides a system for applying sharp, distinct and wear-resistant graphics to a surface of semi-rigid foam, permitting the production of bodyboards and other amusement devices decorated with bold, durable graphics.

What is claimed is:

1. A bodyboard for supporting a rider during travel in ocean surf, comprising:
   an elongate foam plank forming the core of the bodyboard, the core being made of semi-rigid foam having a thickness generally in the range of 1-inch to 4-inches,
   an expanse of skin bonded to the core, the skin including a plurality of layers bonded adhesively together, including an outer layer of nonopaque plastic sheet material having a thickness generally in the range of 1-mil to 5-mils, and an inner layer of plastic sheet material having a thickness generally in the range of 1-mil to 5-mils, and
   the outer layer including graphics imprinted on the side of the sheet which faces the core, the graphics being produced by means of a process for printing graphic images on plastic sheet material, whereby the graphics are visible through the nonopaque outer layer to decorate the bodyboard.

2. A bodyboard as in claim 1 in which each layer of plastic sheet material is approximately 3-mils thick and the resultant skin is a laminated expanse having an overall thickness of approximately 6-mils.

3. A bodyboard as in claim 1 in which, on the outer layer, the graphics on the side of the sheet which faces the core are imprinted in reverse-pattern.

4. A bodyboard as in claim 1 in which, on the outer layer, the graphics imprinted on the side of the sheet which faces the core are formed of ink.

5. A bodyboard for supporting a rider during travel in ocean surf, comprising:
   an elongate foam plank forming the core of the bodyboard, the core being made of semi-rigid foam having a thickness generally in the range of 1-inch to 4-inches,
   a skin bonded to a surface of the core, the skin including a plurality of thin film plastic layers adhesively bonded together to form a laminate, the plastic layers including
   a nonopaque outer layer having a thickness generally in the range of 1-mil to 5-mils and having a first side of the layer which faces toward the core with graphic images imprinted thereon, the images being applied to the first side by means of a printing process which reproduces graphic images onto thin film plastic, and
   an inner layer having a thickness in the range of 1-mil to 5-mils adhesively bonded to the first side of the nonopaque outer layer, and wherein
   the skin is applied to a surface of the core by steps including heating the surface to between 180° Fahrenheit and 220° Fahrenheit, and then pressing skin against the heated surface with the nonopaque layer facing outwardly to form a thermal bond between the skin and the core, whereby the graphic images imprinted on the first side of the nonopaque layer are visible through the layer to decorate the bodyboard.

6. A bodyboard as in claim 5 in which each thin film plastic layer is approximately 3-mils thick and the resultant skin is a laminated expanse having an overall thickness of approximately 6-mils.

7. A bodyboard as in claim 5 in which the graphic images on the first side of the outer layer are imprinted in reverse-pattern.

8. A bodyboard as in claim 5 in which the graphic images imprinted on the first side of the outer layer are formed of ink.

9. A method of applying printed graphics to a substrate of semi-rigid foam which has a thickness generally exceeding 1-inch, the method comprising:
   providing a skin for application to the foam by the following steps,
   imprinting graphics on one side of a nonopaque thin-film plastic sheet having a thickness generally in the range of 2-mils to 5-mils, and
   adhesively bonding the nonopaque sheet to a second thin-film plastic sheet with the graphics-imprinted side of the nonopaque sheet facing the second sheet, resulting in a layered skin with the imprinted graphics visible through the nonopaque sheet, and
   bonding the skin provided in the aforementioned steps to the foam substrate by heating a skin-receiving surface of the foam substrate to a temperature generally in the range of 180° Fahrenheit to 220° Fahrenheit, and
   pressing the skin, with the nonopaque sheet oriented outwardly, against the heated skin-receiving surface to adhere the skin to the foam substrate, whereby a skin covering with visible graphics is provided on the foam.

10. A method as in claim 9 in which the skin formed by the imprinting and bonding steps is collected on a roll prior to being bonded to the foam substrate, and the heating and pressing steps are performed as follows:
    conveying the foam substrate through a heating zone in which the skin-receiving surface is heated to a temperature generally in the range 180° Fahrenheit to 220° Fahrenheit,
    conveying skin from the roll onto the heated skin-receiving surface, and
    conveying the skin and foam between nip rollers to adhere the skin to the foam.

11. A method as in claim 9 in which the step of providing the skin includes adhesively bonding the nonopaque sheet to a second thin-film plastic sheet which is generally in the range of 2-mills to 5-mils thick to form a laminated skin generally in the range of 4-mils to 10-mils thick.

* * * * *